US011837898B2

(12) United States Patent
Takami et al.

(10) Patent No.: US 11,837,898 B2
(45) Date of Patent: Dec. 5, 2023

(54) ELECTRONIC DEVICE-TO-CHARGER SET, AND COMMUNICATION SYSTEM

(71) Applicant: FUJITSU LIMITED, Kawasaki (JP)

(72) Inventors: Ippei Takami, Meguro (JP); Yudai Senzaki, Ota (JP); Tatsuya Honda, Koto (JP); Tomohiro Suzuki, Shinjuku (JP); Yutaro Emoto, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 215 days.

(21) Appl. No.: 17/394,654

(22) Filed: Aug. 5, 2021

(65) Prior Publication Data

US 2021/0376636 A1 Dec. 2, 2021

Related U.S. Application Data

(63) Continuation of application No. PCT/JP2019/007908, filed on Feb. 28, 2019.

(51) Int. Cl.
*H01M 10/46* (2006.01)
*H02J 7/00* (2006.01)
(Continued)

(52) U.S. Cl.
CPC .......... *H02J 7/0045* (2013.01); *H01M 10/46* (2013.01); *G09B 21/009* (2013.01); *H01M 2220/30* (2013.01); *H04R 1/08* (2013.01)

(58) Field of Classification Search
CPC ...... H02J 7/0045; H02J 7/0044; H02J 7/0042; G09B 21/009; H01M 10/46; H01M 2220/30; H04R 1/08; Y02E 60/10
(Continued)

(56) References Cited

U.S. PATENT DOCUMENTS

| 10,916,955 B1* | 2/2021 | Scatino ............... H02J 7/0042 |
| 2018/0167537 A1 | 6/2018 | Takada et al. |
| 2019/0045041 A1* | 2/2019 | Pierce .................. H04M 1/026 |

FOREIGN PATENT DOCUMENTS

| JP | 6-55200 U | 7/1994 |
| JP | 2000-166960 A | 6/2000 |

(Continued)

OTHER PUBLICATIONS

Bridge web site: "Japan's Ontenna hairclip device translates sound to vibration for hearing impaired" BRIDGE, Aug. 29, 2015, XP055879953; Cited in the Extended European Search Report dated Jan. 25, 2022. (15 pages).

(Continued)

*Primary Examiner* — Edward Tso
(74) *Attorney, Agent, or Firm* — WHDA, LLP

(57) ABSTRACT

An electronic device-charger set is provided including an electronic device, and a charger with which the electronic device is configured to interlock. The electronic device includes a body including a batter and a connector electrically connected to the battery, a clip extending along the body, and a magnet provided at the clip. The charger includes a charging connector disposed at a position connecting with the connector in state in which the electronic device is interlocked with the charger, a recess formed at a position to house the clip in state in which the electronic device is interlocked with the charger, and an attracting magnet provided at an opposing portion of the recess opposing the magnet and configured to generate an attraction force between the attracting magnet and the magnet.

13 Claims, 20 Drawing Sheets

(51) Int. Cl.
   *G09B 21/00*      (2006.01)
   *H04R 1/08*       (2006.01)
(58) Field of Classification Search
   USPC .......................... 320/107, 111, 114, 115, 116
   See application file for complete search history.

(56)                References Cited

FOREIGN PATENT DOCUMENTS

| JP | 2012-130227 A | 7/2012 | | |
|----|---------------|--------|---|---|
| JP | 2013-38920 A  | 2/2013 | | |
| JP | 2018-098571 A | 6/2018 | | |
| WO | WO-2017126406 A1 * | 7/2017 | .......... | H04M 1/0202 |

OTHER PUBLICATIONS

The Extended European Search Report dated Jan. 25, 2022, issued in counterpart EP Application No. 19917320.4. (8 pages).
"A new user interface for experiencing sound through hair" http://ontenna.jp, accessed Feb. 21, 2019, cited in Specification (7 pages).
International Search Report dated Apr. 23, 2019, issued in counterpart International Application No. PCT/JP2019/007908, w/English translation (5 pages).

* cited by examiner

FIG. 2
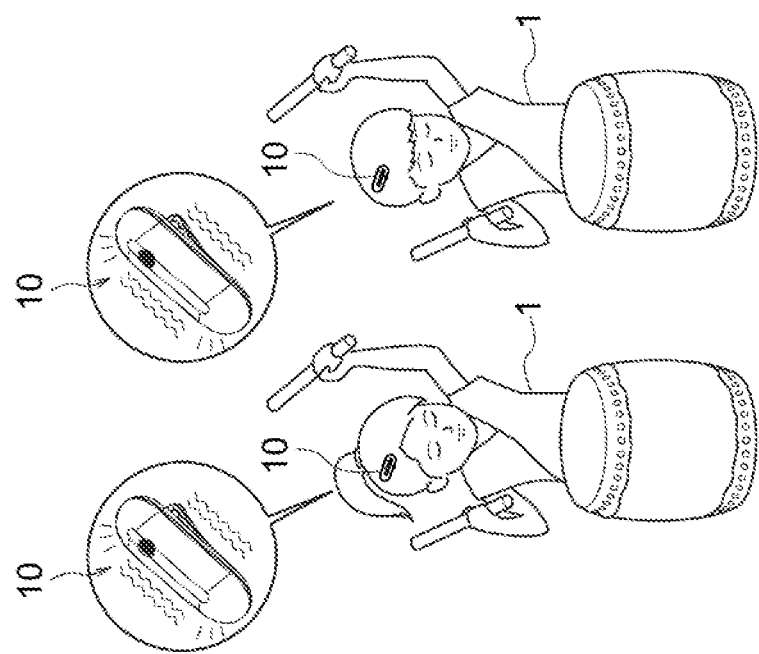
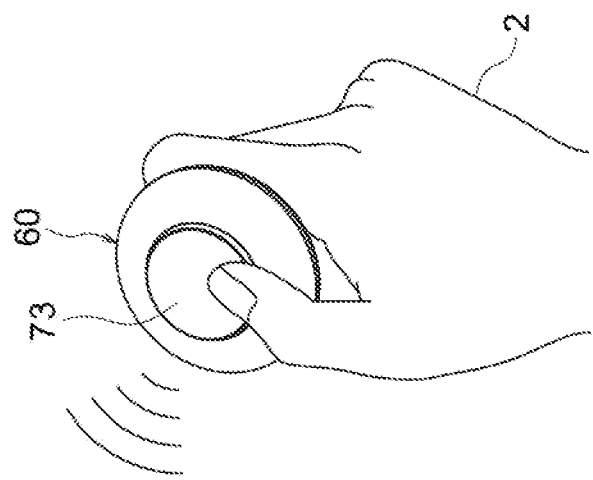

FIG. 3
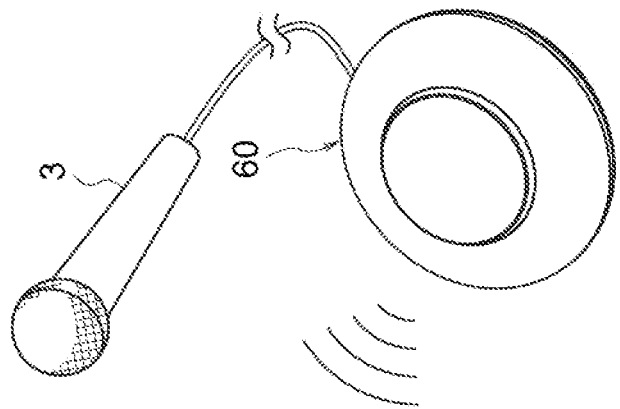
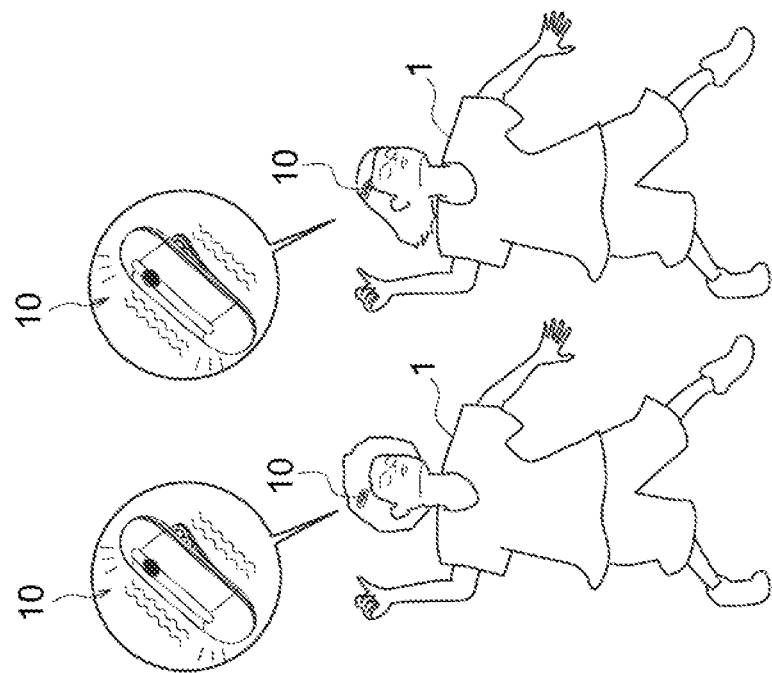

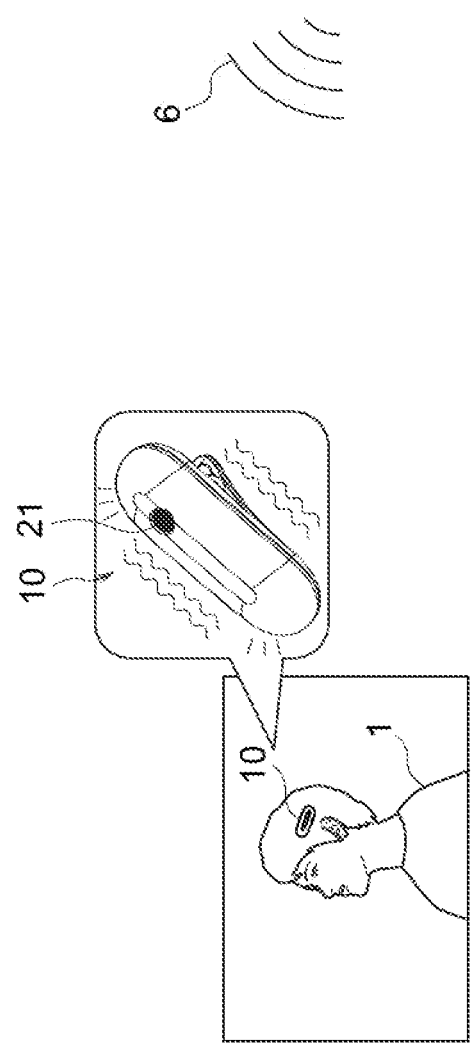

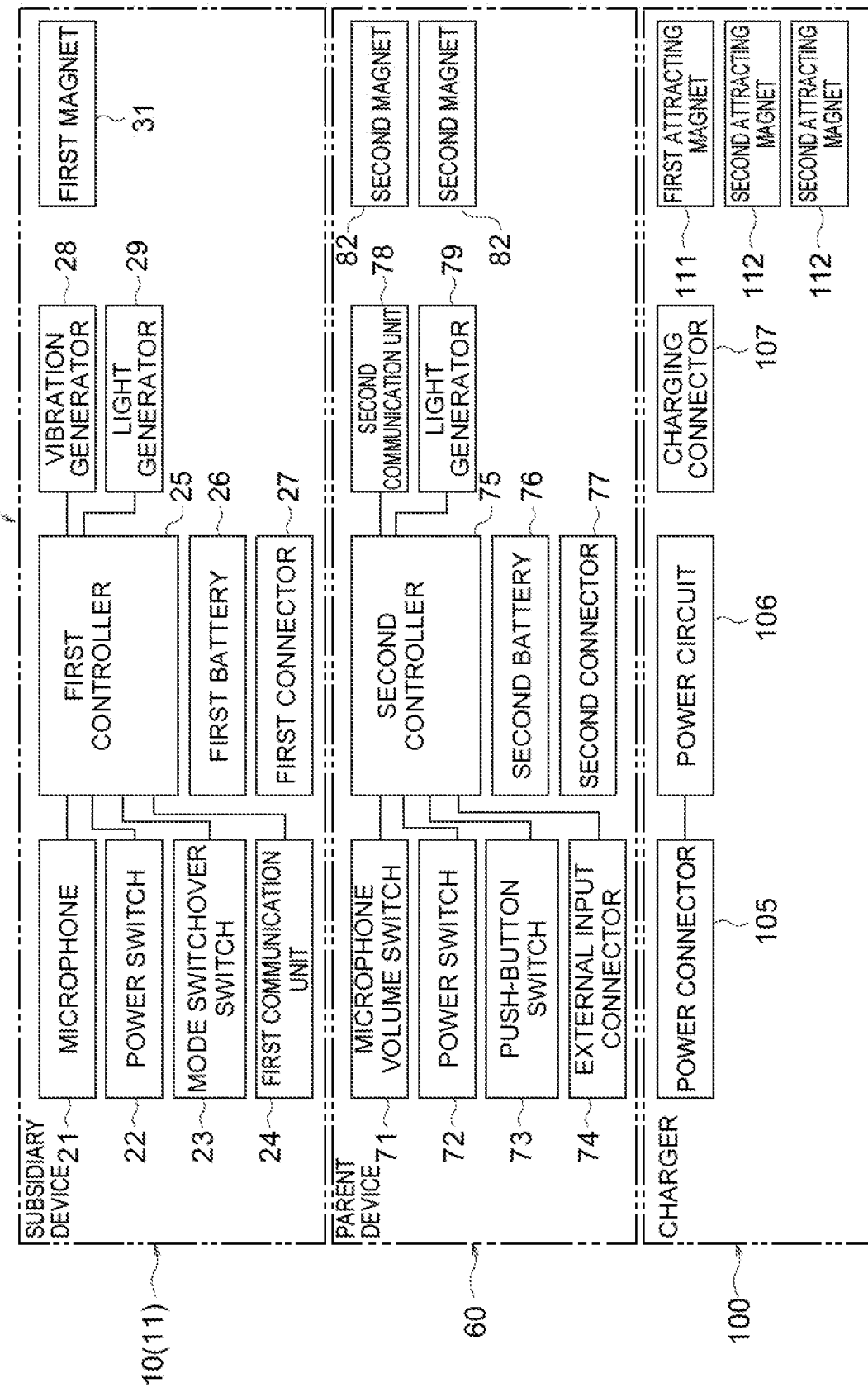

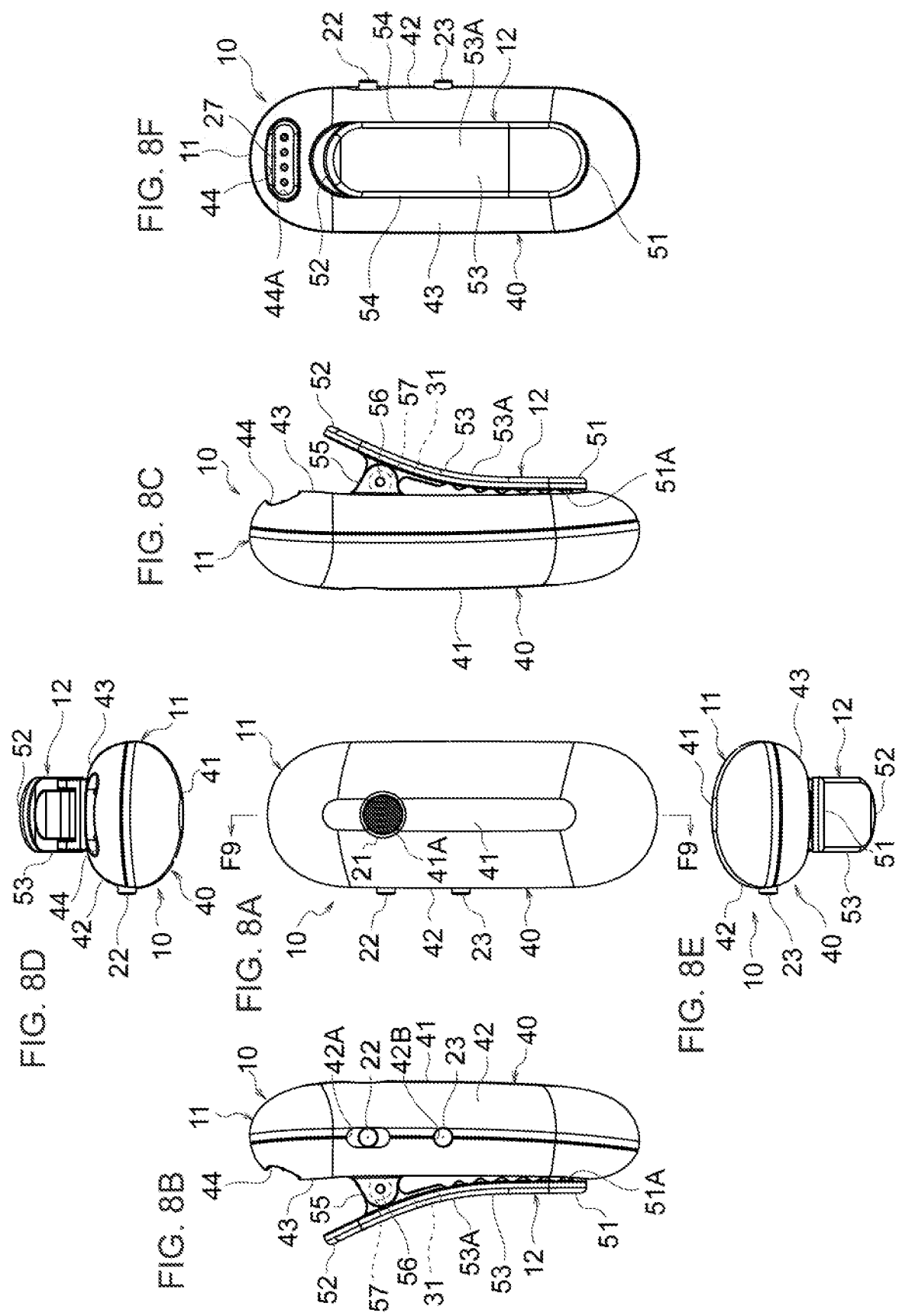

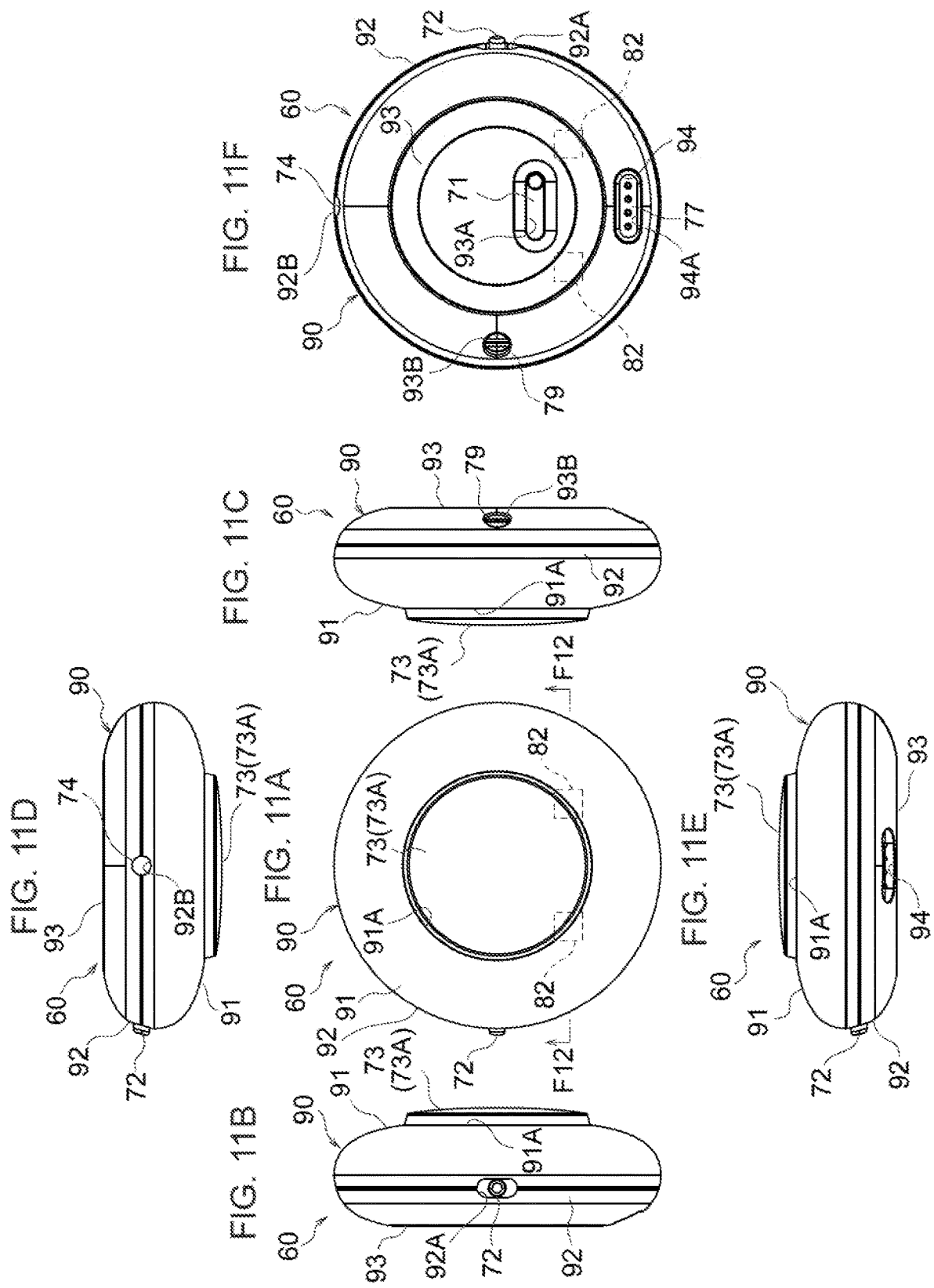

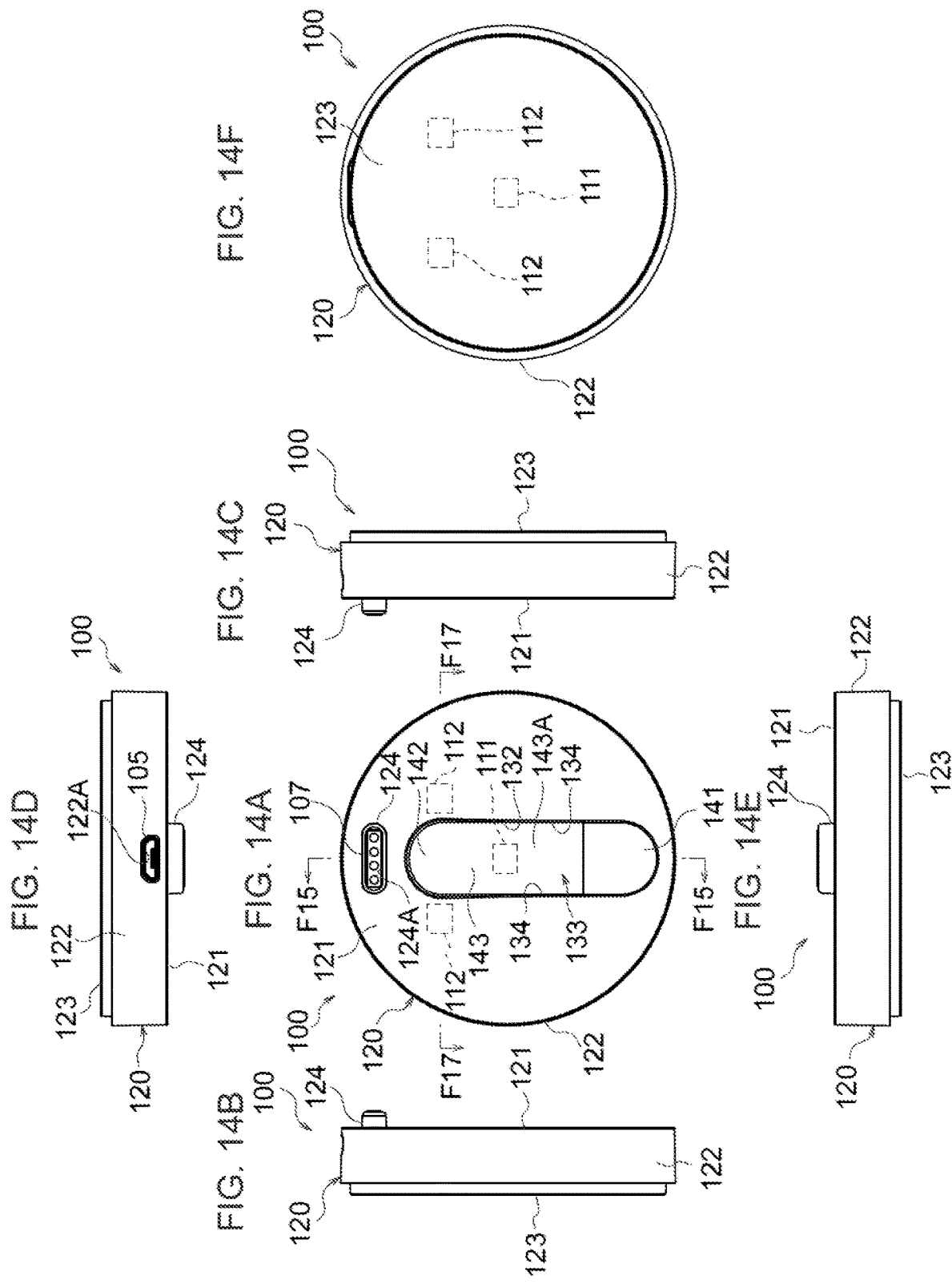

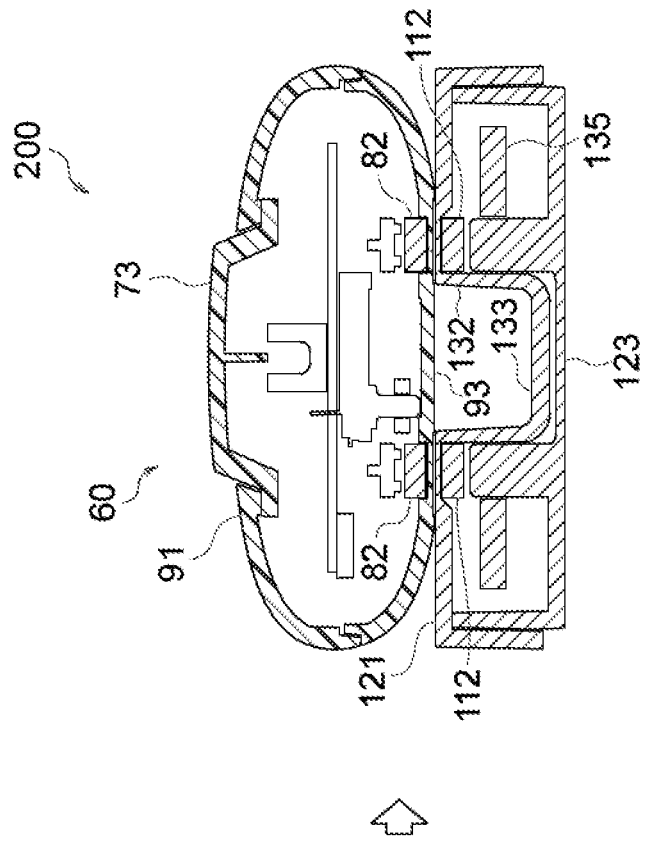
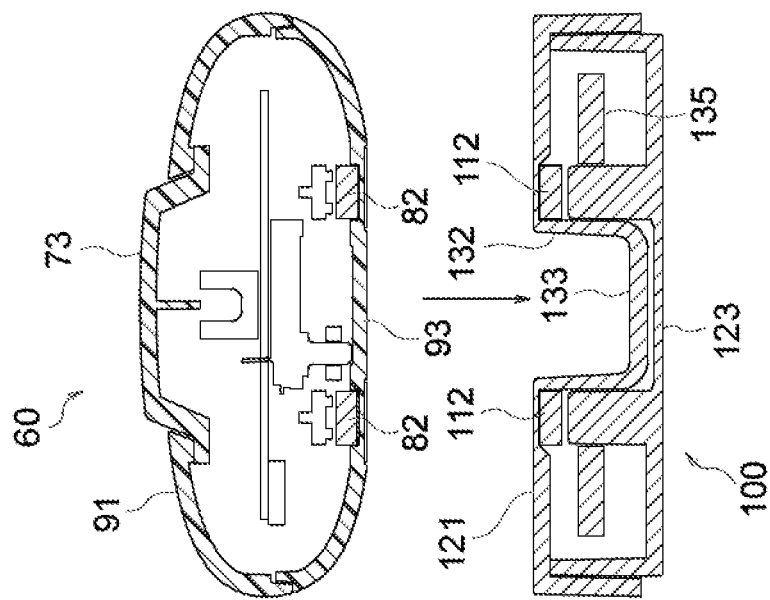
FIG. 20

US 11,837,898 B2

1

ELECTRONIC DEVICE-TO-CHARGER SET, AND COMMUNICATION SYSTEM

CROSS-REFERENCE TO RELATED APPLICATION

This application is a continuation application of International Application No. PCT/JP2019/007908, filed Feb. 28, 2019, the disclosure of which is incorporated herein by reference in its entirety.

FIELD

Technology disclosed herein relates to an electronic device-charger set, and to a communication system.

BACKGROUND

In electronic device-charger sets, an electronic device is interlocked with a charger, such that a connector of the electronic device is connected to a charger connector of the charger. Power from the charger is supplied to a battery of the electronic device through the connector and the charger connector in order to charge the battery (see for example Patent Documents 1 and 2).

Such electronic devices include for example electronic devices with functionality to convert a received signal into vibration, sound, or light (see for example Patent Documents 3 and 4 and Non-Patent Document 1).

RELATED PATENT DOCUMENTS

Patent Document 1: Japanese Patent Application Laid-Open (JP-A) No. 2013-038920
Patent Document 2: JP-A No. 2012-130227
Patent Document 3: JP-A No. 2000-166960
Patent Document 4: Japanese Utility Model Application Laid-Open (JP-U) No. H06-55200
Non-Patent Document 1: A new user interface for experiencing sound through hair (Japanese) http://ontenna.jp, accessed Feb. 21, 2019

SUMMARY

According to an aspect of the embodiments, an electronic device-charger set is provided including an electronic device, and a charger with which the electronic device is configured to interlock. The electronic device includes a body including a battery and a connector electrically connected to the battery, a clip extending along the body, and a magnet provided at the clip. The charger includes a charging connector disposed at a position connecting with the connector in state in which the electronic device is interlocked with the charger, a recess formed at a position to house the clip in state in which the electronic device is interlocked with the charger, and an attracting magnet provided at an opposing portion of the recess opposing the magnet and configured to generate an attraction force between the attracting magnet and the magnet.

The object and advantages of the invention will be realized and attained by means of the elements and combinations particularly pointed out in the claims.

It is to be understood that both the foregoing general description and the following detailed description are exemplary and explanatory and are not restrictive of the invention.

2

BRIEF DESCRIPTION OF DRAWINGS

FIG. 2 is a diagram to explain a first example of usage of subsidiary devices and a parent device illustrated in FIG. 1.
FIG. 3 is a diagram to explain a second example of usage of the subsidiary devices and the parent device illustrated in FIG. 1.
FIG. 5 is a diagram to explain an example of usage in a case in which the subsidiary device in FIG. 1 is used on its own.
FIG. 6 is a block diagram of the communication system illustrated in FIG. 1.
FIGS. 8A-8F are diagrams illustrating the subsidiary device illustrated in FIG. 1 in six planes.
FIGS. 11A-11F are diagrams illustrating the parent device illustrated in FIG. 1 in six planes.
FIGS. 14A-14F are diagrams illustrating a charger illustrated in FIG. 1 in six planes.
FIG. 20 is a diagram to explain interlocking of a parent device illustrated in FIG. 1 with a charger.

DESCRIPTION OF EMBODIMENTS

First, overall explanation follows regarding a communication system according to an exemplary embodiment of technology disclosed herein.

Figure 1:
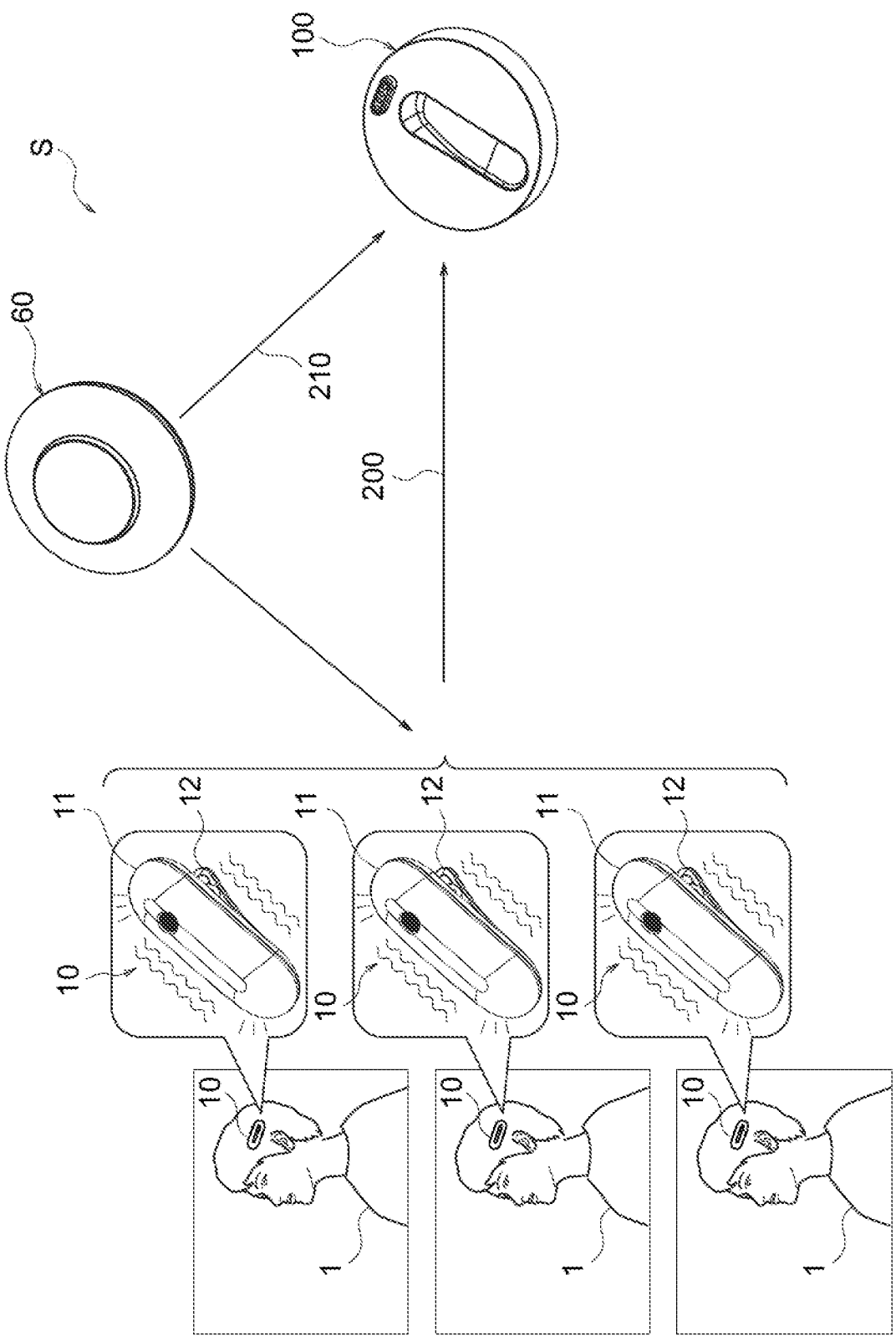
FIG. 1 is an explanatory diagram illustrating a communication system according to an exemplary embodiment of technology disclosed herein.

FIG. 1 schematically illustrates a communication system S according to the present exemplary embodiment. As illustrated in FIG. 1, the communication system S includes plural subsidiary devices 10, a parent device 60, and a charger 100. Each of the plural subsidiary devices 10 is an example of an "electronic device". The plural subsidiary devices 10 are, for example, employed by first users 1, these being hearing-impaired users, and the parent device 60 is employed by a second user. Each of the subsidiary devices 10 includes a body 11 and a clip 12. Hair is pinched between the body 11 and the clip 12 in order to fix the subsidiary device 10 to the hair. The parent device 60 is capable of communicating with the plural subsidiary devices 10. When signals are transmitted from the parent device 60 to the plural subsidiary devices 10, the plural subsidiary devices 10 generate vibration and light in response to the received signals.

The plural subsidiary devices 10 and the parent device 60 are selectively interlocked with the charger 100 for charging by the charger 100. The interlocking of each of the plural subsidiary devices 10 with the charger 100 forms a subsidiary device-charger set 200, and the interlocking of the parent device 60 with the charger 100 forms a parent device-charger set 210. The subsidiary device-charger set 200 is an example of an "electronic device-charger set".

Figure 4:
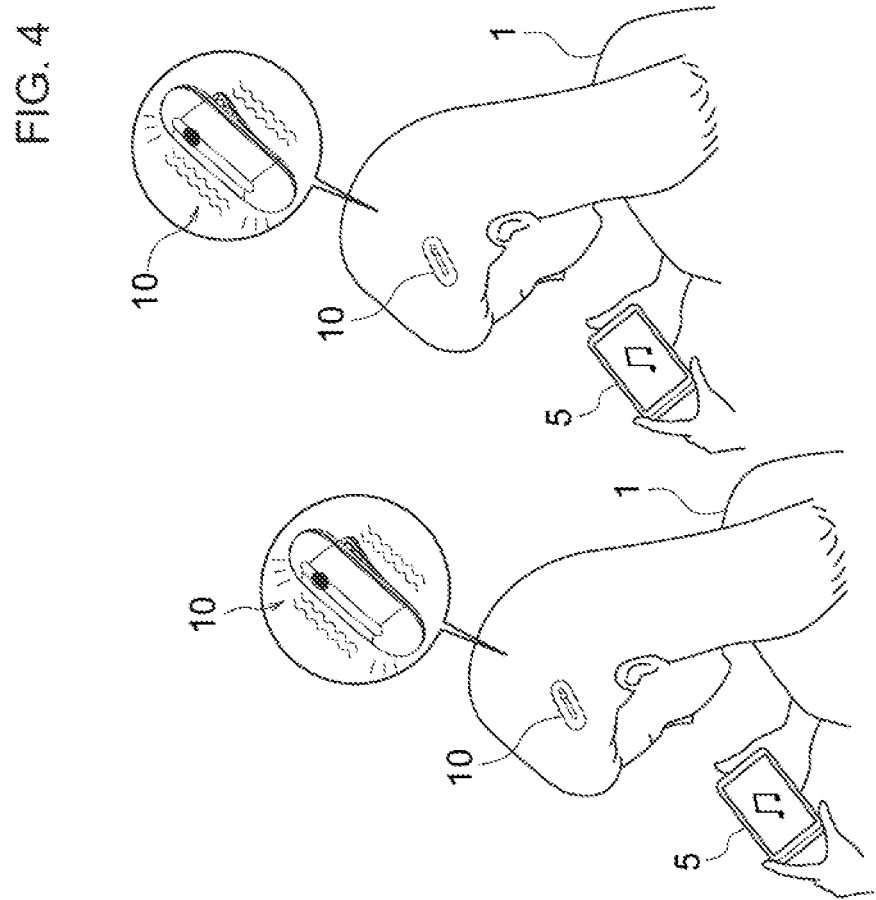
FIG. 4 is a diagram to explain a third example of usage of the subsidiary devices and the parent device illustrated in FIG. 1.

FIG. 2 to FIG. 4 illustrate examples of usage of the plural subsidiary devices 10 and the parent device 60. As illustrated in FIG. 2, a push-button switch 73 is provided to the parent device 60. When a second user 2 presses the push-button switch 73 in time with a rhythm, signals corresponding to the rhythm are transmitted from the parent device 60 to the plural subsidiary devices 10. The subsidiary devices 10 then generate vibration or light in time with the rhythm, enabling the respective first users 1 to be taught the rhythm.

As illustrated in FIG. 3, a microphone 3 can be connected to the parent device 60. When a rhythm is input to the microphone 3 connected to the parent device 60, a signal is transmitted from the parent device 60 to the plural subsidiary devices 10 in time with the rhythm. The subsidiary devices 10 then generate vibration or light in time with the rhythm, enabling the respective first users 1 to be taught the rhythm.

As illustrated in FIG. 4, a smartphone 4 can be connected to the parent device 60. When information corresponding to a rhythm is output from the smartphone 4 connected to the parent device 60, a signal is transmitted to the plural subsidiary devices 10 from the parent device 60 in time with the rhythm. The subsidiary devices 10 then generate vibration or light in time with the rhythm, enabling each of the first users 1 to be taught the rhythm while viewing a screen of a smartphone 5.

The subsidiary devices 10 described above may operate in a parent device communication mode or in a microphone input mode. The subsidiary devices 10 communicate with the parent device 60 as described above when in the parent device communication mode. FIG. 5 illustrates an example of usage when a subsidiary device 10 is being used on its own. As illustrated in FIG. 5, each of the subsidiary devices 10 includes an inbuilt microphone 21. When the subsidiary device 10 is in the microphone input mode and a sound 6 is input to the microphone 21, the subsidiary device 10 is able to generate vibration or light in response to the sound 6 in order to teach the first user 1 about the sound 6. Note that the subsidiary devices 10 are capable of switching between a mode in which only vibration is generated, a mode in which only light is generated, and a mode in which both vibration and light are generated.

FIG. 6 is a block diagram illustrating the communication system S. As illustrated in FIG. 6, the body 11 of each of the subsidiary devices 10 includes the microphone 21, a power switch 22, a mode switchover switch 23, a first communication unit 24, a first controller 25, a first battery 26, a first connector 27, a vibration generator 28, a light generator 29, and a first magnet 31. The microphone 21, the power switch 22, the mode switchover switch 23, the first communication unit 24, the vibration generator 28, and the light generator 29 are each electrically connected to both the first controller 25 and the first battery 26. The first connector 27 is electrically connected to the first battery 26. The first connector 27 is an example of a "connector", the first battery 26 is an example of a "battery", and the first magnet 31 is an example of a "magnet".

The parent device 60 includes a microphone volume switch 71, a power switch 72, the push-button switch 73, an external input connector 74, a second controller 75, a second battery 76, a second connector 77, a second communication unit 78, a light generator 79, and a pair of second magnets 82. The microphone volume switch 71, the power switch 72, the push-button switch 73, the external input connector 74, the second communication unit 78, and the light generator 79 are each electrically connected to the second controller 75 and the second battery 76. The second connector 77 is electrically connected to the second battery 76.

The charger 100 includes a power connector 105, a power circuit 106, a charging connector 107, a first attracting magnet 111, and a pair of second attracting magnets 112. The power connector 105 and the charging connector 107 are each electrically connected to the power circuit 106.

Next, specific explanation follows regarding configuration of subsidiary device 10 according to the present exemplary embodiment.

Figure 7A:
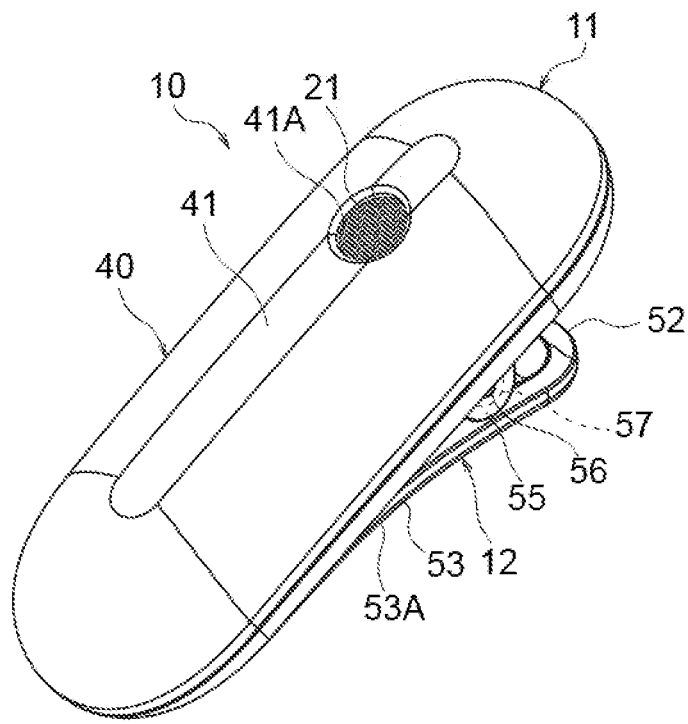
FIGS. 7A and 7B are perspective views illustrating the subsidiary device illustrated in FIG. 1.
Figure 7B:
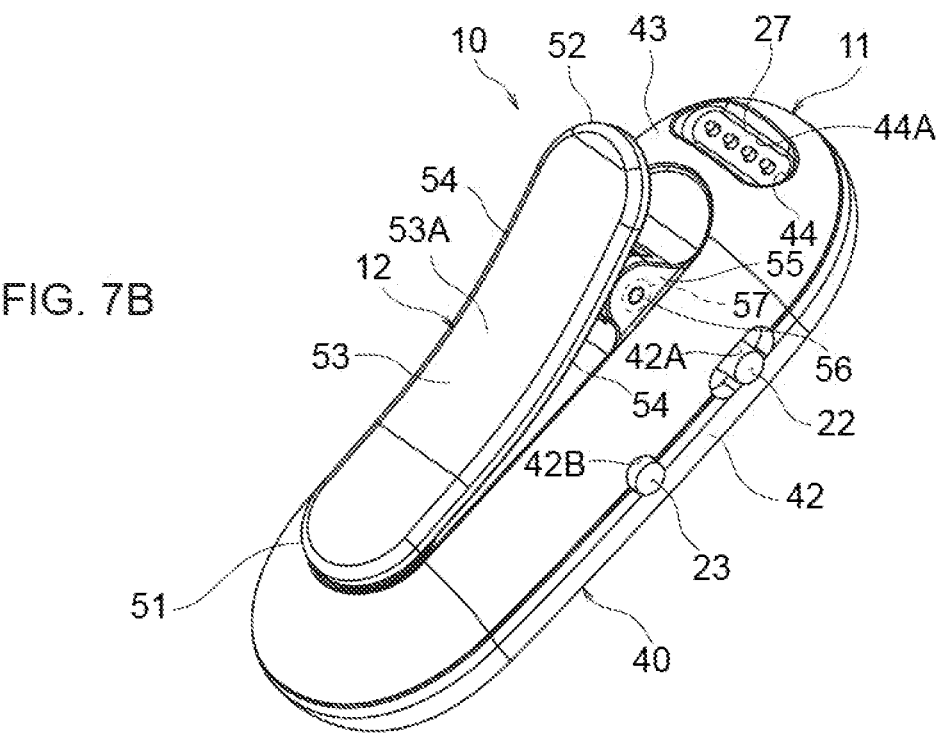

FIGS. 7A-7B and FIGS. 8A-8F illustrate the subsidiary device 10. FIG. 7A is a perspective view illustrating the subsidiary device 10 from the front, and FIG. 7B is a perspective view illustrating the subsidiary device 10 from a back side. FIG. 8A is a front view of the subsidiary device 10, FIG. 8B is a left side view of the subsidiary device 10, FIG. 8C is a right side view of the subsidiary device 10, FIG. 8D is a plan view of the subsidiary device 10, FIG. 8E is a bottom view of the subsidiary device 10, and FIG. 8F is a back view of the subsidiary device 10.

As illustrated FIGS. 7A-7B and FIGS. 8A-8F, the body 11 of the subsidiary device 10 includes a casing 40. The casing 40 is formed at a substantially ellipsoidal shape with its length direction along an up-down direction of the subsidiary device 10. An opening 41A is formed at a front wall 41 of the casing 40, and the microphone 21 is provided atside this opening 41A. A pair of openings 42A, 42B are formed at a left side wall 42 of the casing 40. The power switch 22 is provided at the opening 42A, and the mode switchover switch 23 is provided at the opening 42B. A first engagement recess 44 that is recessed toward the front side of the subsidiary device 10 is formed at a back wall 43 of the casing 40. The first engagement recess 44 is an example of an "engagement recess". An opening 44A is formed at a bottom wall of the first engagement recess 44. The first connector 27 is provided atside the opening 44A.

The clip 12 is formed at a substantially elliptical shape in back view of the subsidiary device 10, and extends along a length direction of the body 11. One length direction end portion of the clip 12 configures a first end portion 51, and another length direction end portion of the clip 12, namely the end portion positioned on the opposite side to the first end portion in the length direction of the clip 12, configures a second end portion 52. A support portion 55 that rotatably supports the clip 12 is provided to the back wall 43 of the casing 40. The support portion 55 includes a support shaft 56 extending along a left-right direction of the body 11, and the clip 12 is capable of pivoting about the support shaft 56.

A torsion spring 57 is assembled to the support shaft 56, and the torsion spring 57 biases the clip 12 in a direction to cause the first end portion 51 to abut the back wall 43. In a state in which force is not being applied to the second end portion 52, elasticity of the torsion spring 57 maintains the first end portion 51 in a state abutting the back wall 43. More specifically, protrusions 51A are formed at the first end portion 51, and these protrusions 51A abut the back wall 43. The second end portion 52 is positioned on the opposite side of the support portion 55 to the first end portion 51, and the second end portion 52 is separated from the back wall 43 in a state in which the first end portion 51 is abutting the back wall 43.

The first connector 27 is disposed on an extension line of the second end portion 52 side of the clip 12 as viewed from the back side of the subsidiary device 10 (see FIG. 8F). Namely, as viewed from the back side of the subsidiary device 10, if the second end portion 52 side of the clip 12 were to be extended in the length direction of the clip 12, the first connector 27 would be disposed at a position overlapping this extension portion. The back side of the subsidiary device 10 is an example of "a side from which the electronic device is interlocked with the charger".

A pair of edge portions that link both left-right direction end portions of the first end portion 51 to both left-right direction end portions of the second end portion 52 configure side portions 54 on both sides of the clip 12. The side portions 54 on both sides of the clip 12 extend parallel to each other along the length direction of the clip 12 in back view of the subsidiary device 10.

Figure 9:
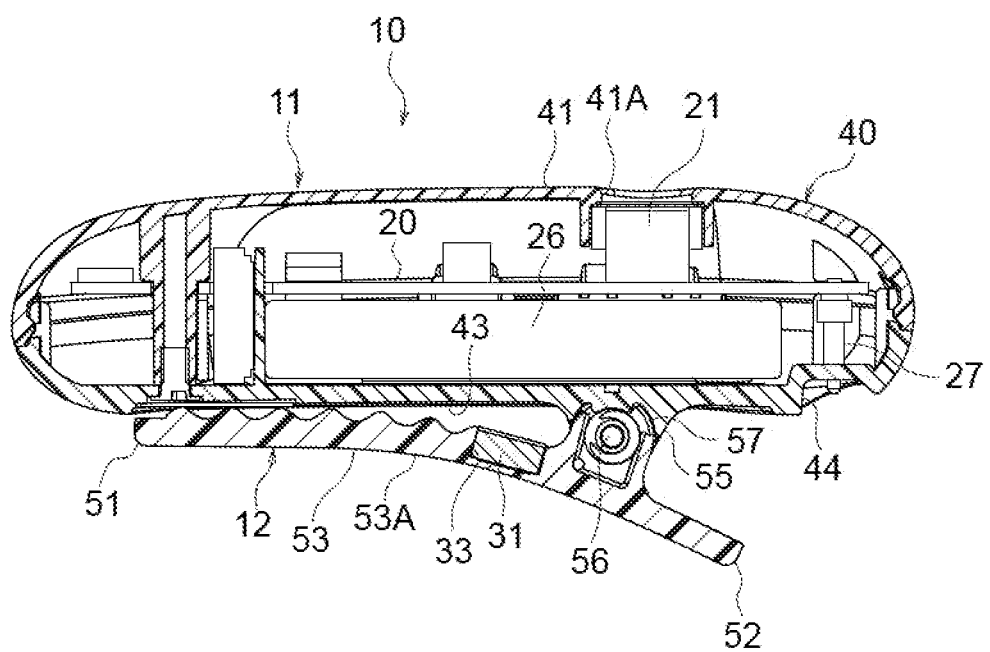
FIG. 9 is a cross-section sectioned along line F9-F9 in FIG. 8A.

FIG. 9 is a cross-section sectioned along line F9-F9 in FIG. 8A. As illustrated in FIG. 9, the subsidiary device 10 includes a substrate 20. The microphone 21, the power switch 22, the mode switchover switch 23, the first communication unit 24, the first controller 25, the first connector 27, the vibration generator 28, and the light generator 29 described above (see FIG. 6 to FIG. 8F) are mounted to the substrate 20. The substrate 20 and the first battery 26 are housed in the casing 40. The substrate 20 is disposed with its board thickness direction in the front-rear direction of the subsidiary device 10, and the first battery 26 is disposed between the substrate 20 and the back wall 43.

A portion between the first end portion 51 and the second end portion 52 of the clip 12 configures a first shaped portion 53. The first shaped portion 53 is shaped so as to gradually increase in distance from the body 11 on progression from the first end portion 51 side toward the second end portion 52 side. As an example, in the present exemplary embodiment, die shape of the first shaped portion 53 is an curved shape that curves so as to gradually increase in distance from the body 11 on progression from the first end portion 51 side toward the second end portion 52 side. An apex of a curved portion 53A of the first shaped portion 53 is positioned at a length direction central portion of the first shaped portion 53. A portion of the clip 12 between the first end portion 51 and the curved portion 53A and a portion of the clip 12 between the curved portion 53A and the second end portion 52 are, as an example, both formed at flat shapes (namely with a straight line profile in side view).

The first magnet 31 is provided at the first shaped portion 53. The first magnet 31 is formed at a flat plate shape. More specifically, the first magnet 31 is disposed further toward the side of the second end portion 52 than the apex of the curved portion 53A that configures the length direction central portion of the first shaped portion 53. The first magnet 31 is disposed further toward the side of the first end portion 51 than the support portion 55. Namely, the first magnet 31 is disposed between the apex of the curved portion 53A of the first shaped portion 53 and the support portion 55.

The first magnet 31 is provided so as to follow the shape of the first shaped portion 53. The first magnet 31 is thus disposed obliquely with respect to the back wall 43 so as to gradually increase in distance from the back wall 43 on progression from the length direction central portion side of the first shaped portion 53 toward the support portion 55 side. A recessed portion 33 that opens toward the body 11 is formed at the clip 12, and the first magnet 31 is fitted into this recessed portion 33.

Next, specific explanation follows regarding configuration of the parent device 60 according to the present exemplary embodiment.

Figure 10A:
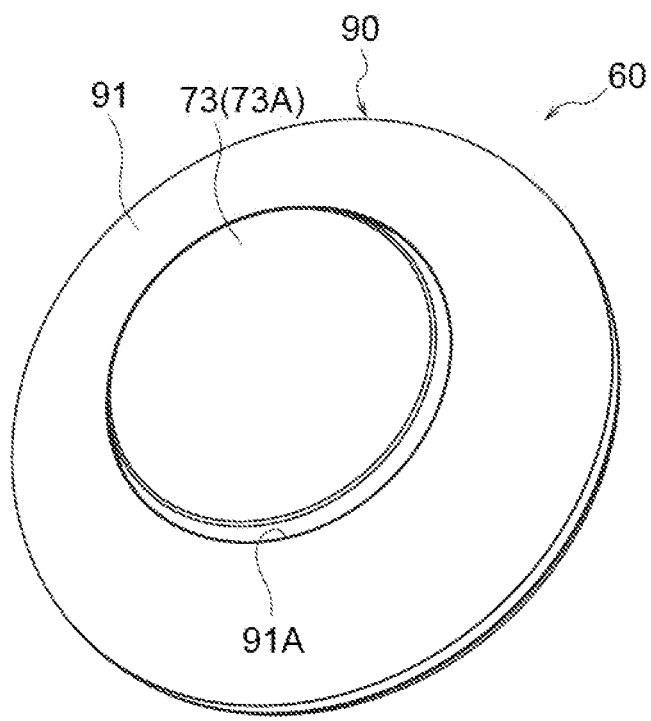
FIGS. 10A and 10B are perspective views illustrating the parent device illustrated in FIG. 1.
Figure 10B:
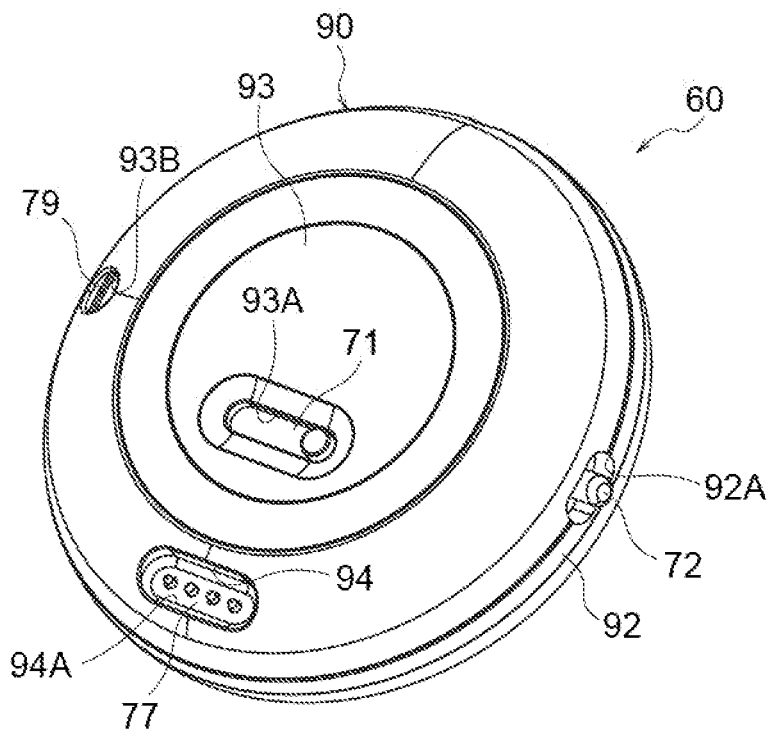

FIGS. 10A-10B and FIGS. 11A-11F illustrate the parent device 60. FIG. 10A is a perspective view illustrating the parent device 60 from the front side, and FIG. 10B is a perspective view illustrating the parent device 60 from the back side. FIG. 11A is a front view of the parent device 60, FIG. 11B is a left side view of the parent device 60, FIG. 11C is a right side view of the parent device 60, FIG. 11D is a plan view of the parent device 60, FIG. 11E is a bottom view of the parent device 60, and FIG. 11F is a back view of the parent device 60.

As illustrated in FIGS. 10A-10B and FIGS. 11A-11F, the parent device 60 includes a casing 90. The casing 90 is formed at a substantially circular disc shape with its thickness direction in the front-rear direction of the parent device 60. As illustrated in FIG. 10A, an opening 91A is formed at a front wall 91 of the casing 90, and a button cover 73A of the push-button switch 73 is provided atside this opening 91A. The button cover 73A is formed at a circular shape in front view of the parent device 60.

An opening 92A and an opening 92B are formed at a peripheral wall 92 of the casing 90. The power switch 72 is provided atside the opening 92A, and the external input connector 74 is provided atside the opening 92B. An opening 93A and an opening 93B are formed at a back wall 93 of the casing 90. The microphone volume switch 71 is provided atside the opening 93A and the light generator 79 is provided atside the opening 93B. A second engagement recess 94 that is recessed toward the front face of the parent device 60 is formed at the back wall 93 of the casing 90. An opening 94A is formed at a bottom wall of the second engagement recess 94, and the second connector 77 is provided atside this opening 94A.

Figure 12:
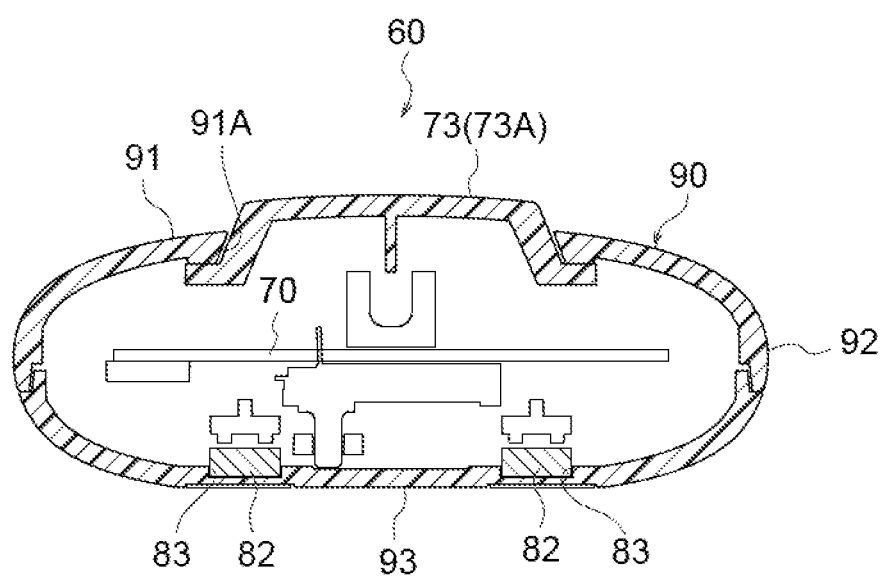
FIG. 12 is a cross-section sectioned along line F12-F12 in FIG. 11A.

FIG. 12 is a cross-section sectioned along line F12-F12 in FIG. 11A. As illustrated in FIG. 12, the parent device 60 includes a substrate 70. The substrate 70 is mounted with the microphone volume switch 71, the power switch 72, the push-button switch 73, the external input connector 74, the second controller 75, the second connector 77, the second communication unit 78, and the light generator 79 described above (see FIG. 6, FIGS. 10A-10B, and FIGS. 11A-11F). The substrate 70 and the second battery 76 are housed inside the casing 90. The substrate 70 is disposed with its board thickness direction in the front-rear direction of the parent device 60.

The pair of second magnets 82 are disposed arrayed in the left-right direction of the parent device 60. The pair of second magnets 82 are provided to the back wall 93. A pair of recessed portions 83 that open toward the front wall 91 are formed at the back wall 93. The pair of second magnets 82 are respectively fitted into the pair of recessed portions 83.

Next, specific explanation follows regarding the configuration of the charger 100 according to the present exemplary embodiment.

Figure 13A:
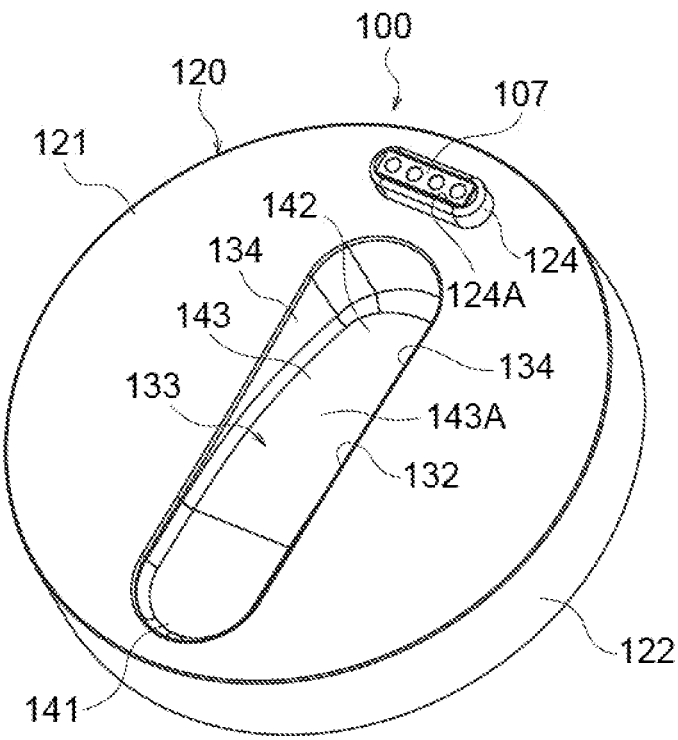
FIGS. 13A and 13B are perspective views illustrating a charger illustrated in FIG. 1.
Figure 13B:
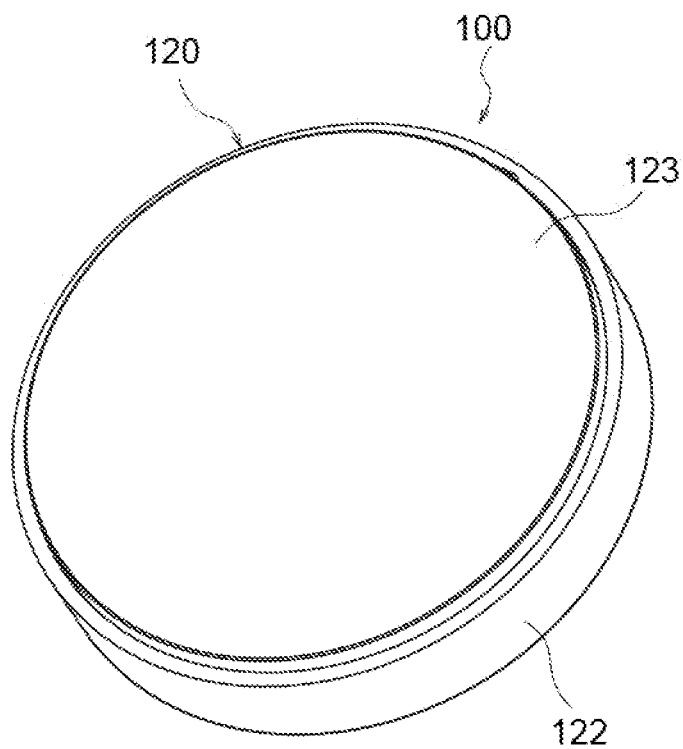

FIGS. 13A-13B and FIGS. 14A-14F illustrate the charger 100. FIG. 13A is a perspective view illustrating the charger 100 from the front, and FIG. 13B is a perspective view illustrating the charger 100 from the back side. FIG. 14A is a front view of the charger 100, FIG. 14B is a left side view of the charger 100, FIG. 14C is a right side view of the charger 100, FIG. 14D is a plan view of the charger 100, FIG. 14E is a bottom view of the charger 100, and FIG. 14F is a back view of the charger 100.

As illustrated in FIGS. 13A-13B and FIGS. 14A-14F, the charger 100 includes a casing 120. The casing 120 is formed at a substantially circular disc shape with its thickness direction in a front-rear direction of the charger 100. A recess 132 that is recessed toward the back face of the charger 100A is formed at a front wall 121 of the casing 120. The front wall 121 formed with the recess 132 is an example of a "wall of the charger that opposes the body". As an example, the recess 132 is formed at a central portion of the front wall 121.

The recess 132 is formed at a substantially elliptical shape extending in an, up-down direction of the charger 100 in front view of the charger 100. When the subsidiary device 10 described above is interlocked with the charger 100, the clip 12 (see FIG. 7A to FIG. 9) is housed in the recess 132. The recess 132 is formed at a shape that is slightly larger than but otherwise resembles the shape of the clip 12 described above in front view of the charger 100. Side faces 134 on both sides of the recess 132 are formed so as follow the side portions 54 (see FIG. 7A to FIG. 9) on both sides of the clip 12 described above.

An engagement protrusion 124 that protrudes toward the front face side of the charger 100 is formed to the front wall 121 of the casing 120. An opening 124A is formed at a top wall of the engagement protrusion 124. The charging connector 107 is provided atside the opening 124A. The charging connector 107 is disposed at a position to connect to the first connector 27 (see FIG. 7A to FIG. 9) in state in which the subsidiary device 10 is interlocked with the charger 100, and to connect to the second connector 77 (see FIG. 10A to FIG. 12) in state in which the parent device 60 is interlocked with the charger 100. The engagement protrusion 124 has a shape to engage with the first engagement recess 44 (see FIG. 7A to FIG. 9) and with the second engagement recess 94 (see FIG. 10A to FIG. 12), described previously.

The charging connector 107 is disposed on an extension line of the length direction of the recess 132 in front view of the charger 100 (see FIG. 14A). Namely, in front view of the charger 100, if the second connector 77 side of the recess 132 were to be extended in the length direction of the recess 132, the second connector 77 would be disposed at a position overlapping this extension portion. An opening 122A is formed at a peripheral wall 122 of the casing 120, and the power connector 105 is provided atside this opening 122A. A non-illustrated power cable is connected to the power connector 105.

Figure 15:
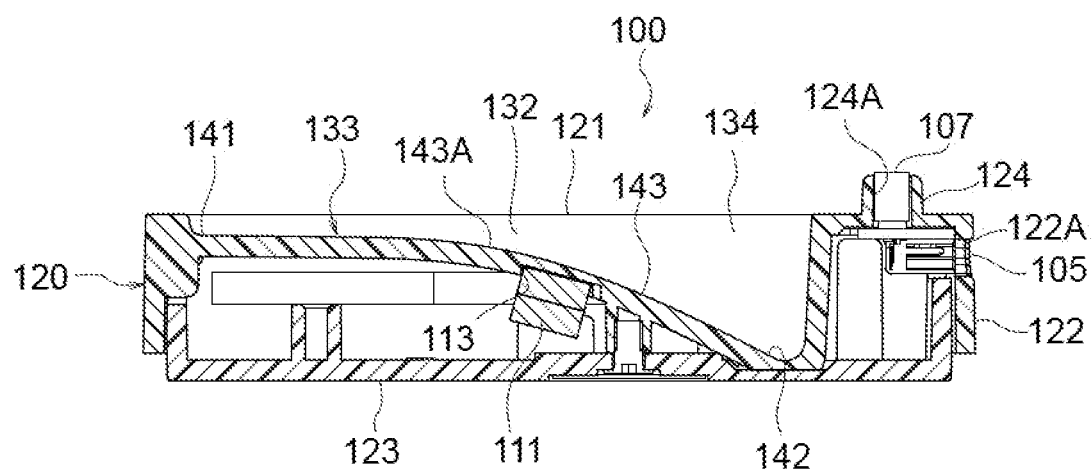
FIG. 15 is a cross-section sectioned along line F15-F15 in FIG. 14A.
Figure 16:
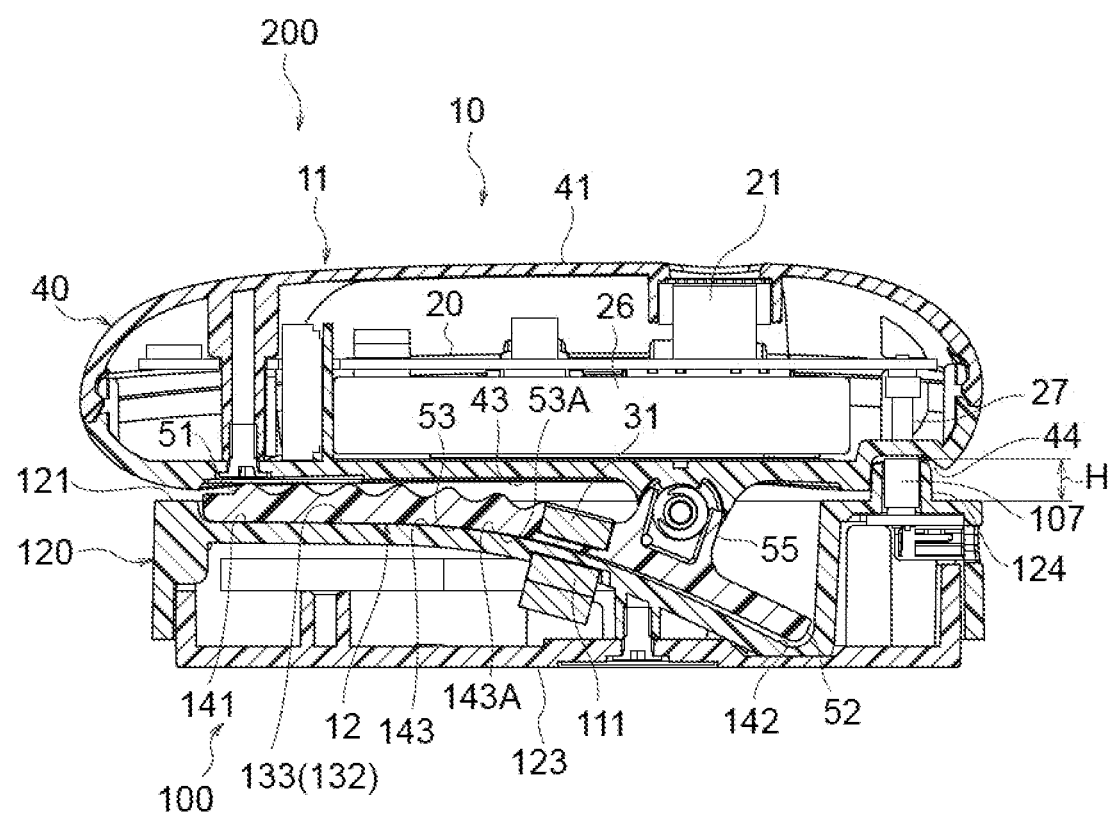
FIG. 16 is a cross-section illustrating a state in which the subsidiary device illustrated in FIG. 1 is interlocked with a charger.

FIG. 15 is a cross-section sectioned along line F15-F15 in FIG. 14A. Moreover, FIG. 16 illustrates a state in which the subsidiary device 10 illustrated in FIG. 1 is interlocked with the charger 100. As illustrated in FIG. 15 and FIG. 16, the first connector 27 and the charging connector 107 are respectively disposed in orientations so as to connect in a direction in which the subsidiary device 10 is interlocked with the charger 100. Namely, the first connector 27 is disposed facing toward the charger 100, and the charging connector 107 is disposed facing toward the subsidiary device 10.

As a result of being provided to the engagement protrusion 124, the charging connector 107 projects outward from the front wall 121. Namely, the charging connector 107 has a projection height H relative to the front wall 121 of the charger 100. The projection height H is set to a height such that a gap is formed between the second end portion 52 of the clip 12 and a second opposing portion 142 of a bottom wall 133 that opposes the second end portion 52 in a state in which the first connector 27 and the charging connector 107 have been connected together.

The recess 132 is formed at a position to house the clip 12 in state in which the subsidiary device 10 is interlocked with the charger 100. The recess 132 includes the bottom wall 133. The bottom wall 133 includes a first opposing portion 141, the second opposing portion 142, and a second shaped portion 143 that respectively oppose the first end portion 51, the second end portion 52, and the first shaped portion 53 of the clip 12. The first opposing portion 141 configures one length direction end portion of the bottom wall 133, and the second opposing portion 142 configures the other length direction end portion of the bottom wall 133. The first opposing portion 141 is positioned on the same side as the first end portion 51 of the clip 12, and opposes this first end portion 51. The second opposing portion 142 is positioned on the same side as the second end portion 52 of the clip 12, and opposes this second end portion 52.

The second shaped portion 143 is a portion between the first opposing portion 141 and the second opposing portion 142 of the bottom wall 133. The second shaped portion 143 is shaped so as to gradually increase in distance from the front wall 121 of the charger 100 on progression from the first opposing portion 141 side toward the second opposing portion 142 side. In the present exemplary embodiment, as an example, similarly to the first shaped portion 53, the shape of the second shaped portion 143 is an curved shape that curves so as to gradually increase in distance from the front wall 121 on progression from the first opposing portion 141 side toward the second opposing portion 142 side. An apex of a curved portion 143A of the second shaped portion 143 is positioned at a length direction central portion of the second shaped portion 143. A portion of the bottom wall 133 between the first opposing portion 141 and the curved portion 143A and a portion of the bottom wall 133 between the curved portion 143A and the second opposing portion 142 are, as an example, each formed at a flat shape (namely have a straight line profile in side view). The first shaped portion 53 formed to the clip 12 described previously has a curved shape that curves so as to follow the second shaped portion 143.

The first attracting magnet 111 is an example of an "attracting magnet", and is provided at the second shaped portion 143. As an example, in the present exemplary embodiment, two magnets are superimposed on each other so as to configure the first attracting magnet 111 from these two magnets. Each of the two magnets configuring the first attracting magnet 111 is formed with a flat disc shape. The first attracting magnet 111 is provided at an opposing portion in the bottom wall 133 that opposes the first magnet 31. The first attracting magnet 111 is orientated so as to generate an attraction force between itself and the first magnet 31. Namely, the first attracting magnet 111 is disposed such that the polarity on the first magnet 31 side of the first attracting magnet 111 is the opposite polarity to the polarity on the first attracting magnet 111 side of the first magnet 31.

More specifically, the first attracting magnet 111 is disposed further toward the side of the second opposing portion 142 than the apex of the curved portion 143A configuring the length direction central portion of the second shaped portion 143. The first attracting magnet 111 is also disposed further toward the side of the first opposing portion 141 than an opposing portion that opposes the support portion 55. Namely, the first attracting magnet 111 is disposed between the apex of the curved portion 143A configuring the length direction central portion of the second shaped portion 143, and the opposing portion that opposes the support portion 55.

The first attracting magnet 111 is provided so as to follow the shape of the second shaped portion 143. The first attracting magnet 111 is thus disposed obliquely with respect to the front wall 121 so as to gradually increase in distance from the front wall 121 on progression from the length direction central portion side of the second shaped portion 143 toward the side of the opposing portion that opposes the support portion 55. A recessed portion 113 that opens toward the opposite side to the front wall 121 is formed at the bottom wall 133. A first magnet configuring the first attracting magnet 111 is fitted into the recessed portion 113, and a second magnet configuring the fast attracting magnet 111 is fixed to the first magnet.

Figure 17:
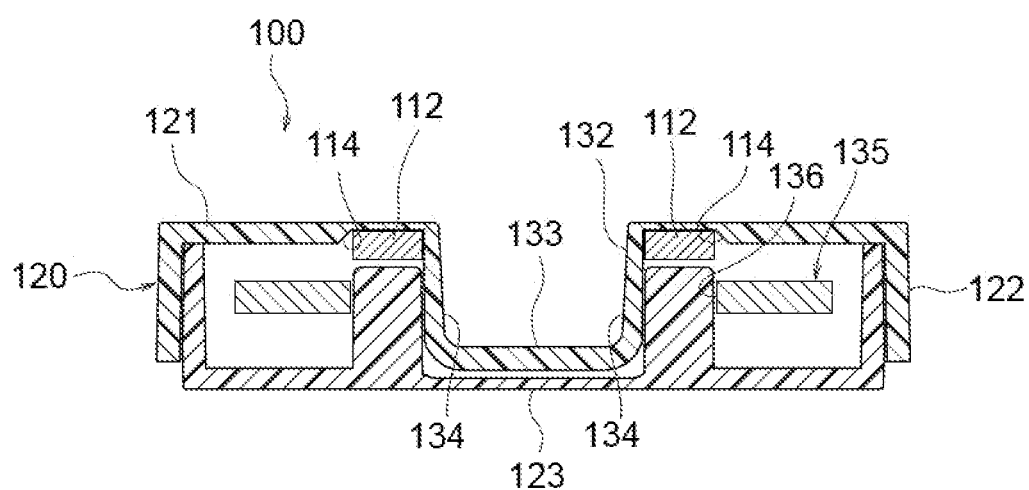
FIG. 17 is, a cross-section sectioned along line F17-F17 in FIG. 14A.
Figure 18:
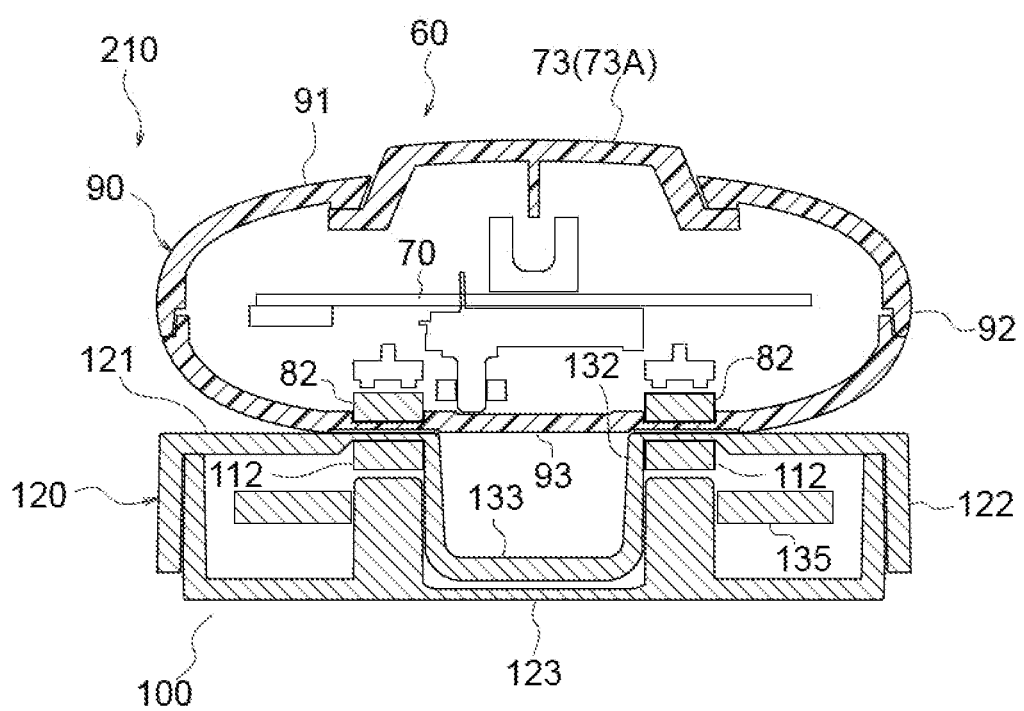
FIG. 18 is a cross-section illustrating a state in which the parent device illustrated in FIG. 1 is interlocked with a charger.

FIG. 17 is a cross-section sectioned along line F17-F17 in FIG. 14A. FIG. 18 illustrates a state in which the parent device 60 illustrated in FIG. 1 is interlocked with the charger 100. As illustrated in FIG. 17 and FIG. 18, the pair of second attracting magnets 112 are disposed arrayed along the left-right direction of the charger 100. The pair of second attracting magnets 112 are provided to the front wall 121 at respective opposing portions that oppose the pair of second magnets 82. Specifically, the pair of second attracting magnets 112 are provided at portions on both width-direction sides of the recess 132. The pair of second magnets 82 described previously are provided at respective opposing portions that oppose these portions on both width-direction sides of the recess 132.

A pair of recessed portions 114 that open toward a back wall 123 are formed at the front wall 121. The pair of second attracting magnets 112 are fitted into the pair of recessed portions 114. The pair of second attracting magnets 112 are orientated so as to generate an attraction force between themselves and the pair of second magnets 82. Namely, each of the second attracting magnets 112 is disposed such that the polarity on the second magnet 82 side of the second attracting magnet 112 is the opposite polarity to the polarity on the second attracting magnet 112 side of the corresponding second magnet 82.

The charger 100 further includes a weight 135. The weight 135 is disposed with its plate thickness direction in the front-rear direction of the charger 100. The weight 135 is housed in the casing 120. The weight 135 is formed at a substantially C-shape in front view of the charger 100. A groove 136 is formed through a central portion of the weight 135 so as to extend along the up-down direction of the charger 100, and the recess 132 is disposed within the groove 136.

Next, explanation follows regarding operation and advantageous effects of the present exemplary embodiment, as well as a method for selectively interlocking the subsidiary device 10 and the parent device 60 with the charger 100.

Figure 19:
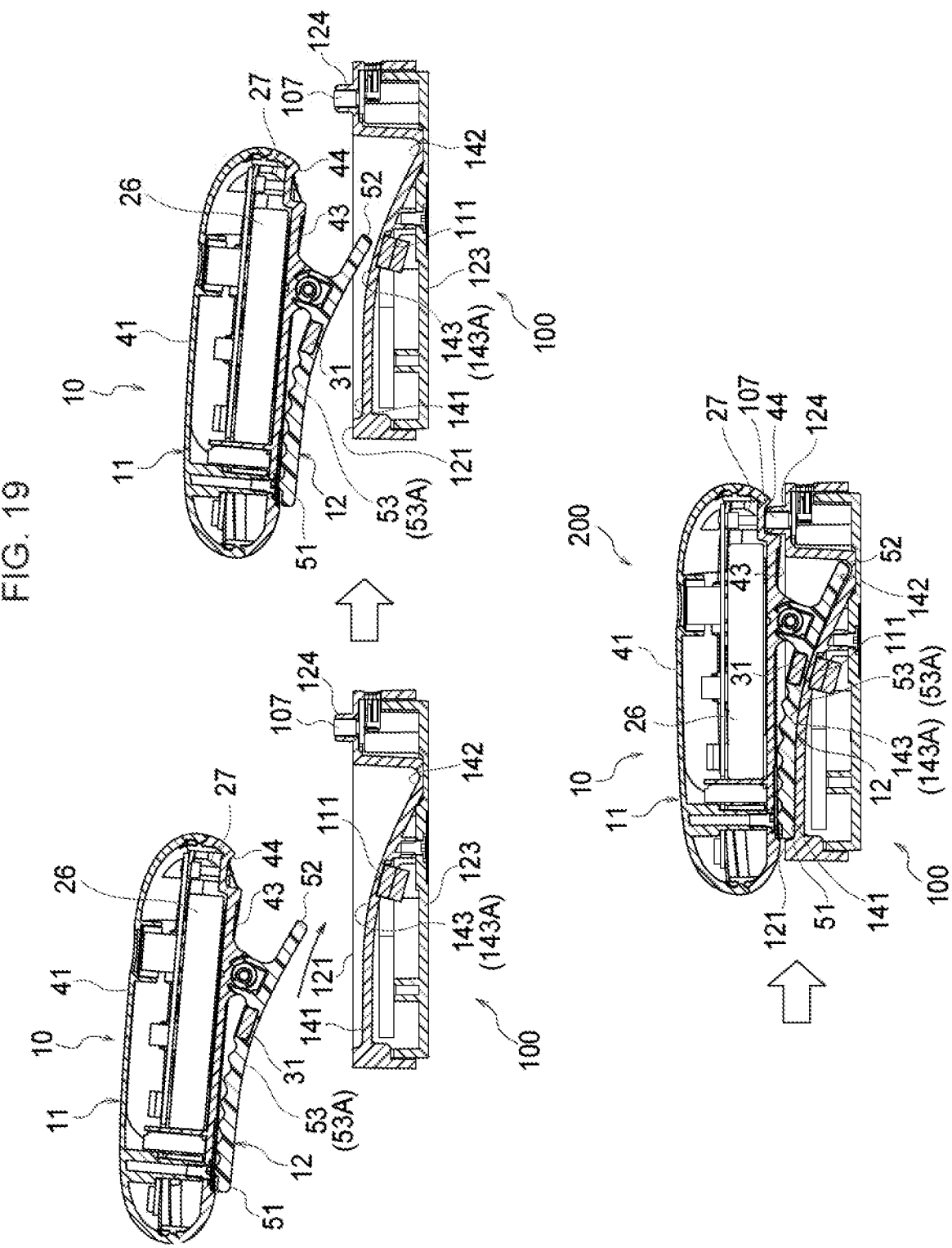
FIG. 19 is a diagram to explain interlocking of the subsidiary device illustrated in FIG. 1 with a charger.

FIG. 19 illustrates interlocking of the subsidiary device 10 illustrated in FIG. 1 with the charger 100. The subsidiary device 10 is gradually brought toward the charger 100 from diagonally above the front of the charger 100, and interlocked with the charger 100. When this is performed, the second end portion 52 of the clip 12 slides against the bottom wall 133 of the recess 132 as the clip 12 is inserted into the recess 132.

The first magnet 31 is provided at the clip 12, and the first attracting magnet 111 that generates an attraction force between itself and the first magnet 31 is provided to the opposing portion of the bottom wall 133 of the recess 132 that opposes the first magnet 31. Accordingly, as the clip 12 is inserted into the recess 132, the clip 12 is drawn into the recess 132 by the attraction force generated between the first magnet 31 and the first attracting magnet 111. The clip 12 is then housed in the recess 132 with the subsidiary device 10 interlocked with the charger 100 at the correct position.

Moreover, the first connector 27 is provided to the body 11 of the subsidiary device 10, and the charging connector 107 is provided to the charger 100. The charging connector 107 is disposed at a position to connect with the first connector 27 when the subsidiary device 10 is interlocked with the charger 100. Accordingly, at the same time as the subsidiary device 10 interlocks with the charger 100 at the correct position, the first connector 27 connects to the charging connector 107. The connection between the first connector 27 and the charging connector 107 enables power to be supplied from the charger 100 to the first battery 26 through the first connector 27 and the charging connector 107, thus charging the first battery 26.

In this manner, in the present exemplary embodiment, the attraction force generated between the first magnet 31 provided at the clip 12 and the first attracting magnet 111 provided to the bottom wall 133 of the recess 132 enables the clip 12 to be drawn into the recess 132. Accordingly, the subsidiary device 10 can easily be interlocked with the charger 100 at the correct position in order to allow trouble-free charging of the first battery 26 of the subsidiary device 10.

The clip 12 includes the first shaped portion 53, and the bottom wall 133 of the recess 132 includes the second shaped portion 143 that opposes the first shaped portion 53. The second shaped portion 143 is shaped so as to gradually increase in distance from the front wall 121 on progression from the first opposing portion 141 side toward the second opposing portion 142 side. The first magnet 31 and the first attracting magnet 111 are respectively provided at the first shaped portion 53 and the second shaped portion 143. Accordingly, an attraction force is generated between the first magnet 31 and the first attracting magnet 111, thereby enabling the clip 12 to be drawn into the recess 132 as the second end portion 52 of the clip 12 slides against the bottom wall 133 of the recess 132. This enables the subsidiary device 10 to be interlocked with the charger 100 in a stable orientation.

Moreover, the second shaped portion 143 has an curved shape that curves so as to gradually increase in distance from the front wall 121 on progression from the first opposing portion 141 side toward the second opposing portion 142 side. Accordingly, as the second end portion 52 of the clip 12 slides against the bottom wall 133 of the recess 132, when the second end portion 52 passes the apex of the curved portion 53A of the second shaped portion 143, a movement amount of the clip 12 toward the bottom wall 133 increases. This enables the clip 12 to be drawn into the recess 132 more energetically, enabling the subsidiary device 10 to be even more accurately interlocked with the charger 100 at the correct position.

The first attracting magnet 111 is disposed further toward the second opposing portion 142 side than the apex of the curved portion 143A configuring the length direction central portion of the second shaped portion 143. Accordingly, when the second end portion 52 of the clip 12 passes the apex of the curved portion 53A of the second shaped portion 143, the attraction force generated between the first magnet 31 and the first attracting magnet 111 becomes stronger, enabling the clip 12 to be drawn into the recess 132 even more energetically.

The side portions 54 on both sides of the clip 12 (see FIGS. 8A-8F) extend parallel to each other along the length direction of the clip 12, and the side faces 134 on both sides of the recess 132. (see FIGS. 14A-14F) are formed so as to follow the side portions 54 on both sides of the clip 12. Accordingly, the side faces 134 on both sides of the recess 132 act as guide portions to guide the side portions 54 on both sides of the clip 12, thereby enabling linear insertion of the clip 12 into the recess 132 along the length direction of the clip 12. This enables the occurrence of positional misalignment of the subsidiary device 10 to be suppressed when interlocking the subsidiary device 10 with the charger 100.

The first connector 27 is disposed on an extension line of the second end portion 52 side of the clip 12 as viewed from the side from which the subsidiary device 10 is interlocked with the charger 100 (see FIG. 8F). This enables the first connector 27 to be smoothly connected to the charging connector 107 accompanying linear insertion of the clip 12 into the recess 132 along the length direction of the clip 12.

Moreover, the first engagement recess 44 is formed at the body 11 of the subsidiary device 10, and the engagement protrusion 124 that has a shape to engage with the first engagement recess 44 is formed to the charger 100. The first connector 27 is provided at the first engagement recess 44, and the charging connector 107 is provided to the engagement protrusion 124. Accordingly, the first connector 27 can be guided to the charging connector 107 by engaging the engagement protrusion 124 with the first engagement recess 44. This enables the first connector 27 to be smoothly connected to the charging connector 107.

The charging connector 107 provided to the engagement protrusion 124 projects by the projection height H with respect to the front wall 121 of the charger 100 (see FIG. 16). The projection height H is set to a height that creates a gap between the second end portion 52 of the clip 12 and the opposing second opposing portion 142 of the bottom wall 133 in a state in which the first connector 27 and the charging connector 107 have been connected together. Accordingly, in a state in which the subsidiary device 10 and the charger 100 have been placed horizontally, the first connector 27 and the charging connector 107 can be connected in a state in which the weight of the subsidiary device 10 rests on the first connector 27. This enables a reliable connection to be made between the first connector 27 and the charging connector 107.

The first magnet 31 is disposed further toward the side of the first end portion 51 than the support portion 55. This enables a gap between the second end portion 52 and the body 11 to be secured, in comparison to cases in which, for example, the first magnet 31 is disposed further toward the side of the second end portion 52 than the support portion 55. This enables the first magnet 31 and the body 11 to be suppressed from interfering with each other as the clip 12 is pivoted, thereby enabling a pivot amount of the clip 12 to be secured.

FIG. 20 illustrates interlocking of the parent device 60 illustrated in FIG. 1 with the charger 100. The parent device 60 is gradually brought toward the charger 100 from above the front of the charger 100, and interlocked with the charger 100. The parent device 60 includes the second magnets 82, and the charger 100 is provided with the second attracting magnets 112 at opposing portions that oppose the second magnets 82 so as to generate an attraction force between themselves and the second magnets 82. Accordingly, as the parent device 60 approaches the charger 100, the attraction force generated between the second magnets 82 and the second attracting magnets 112 draws the parent device 60 toward the charger 100, thus interlocking the parent device 60 with the charger 100 at the correct position.

The parent device 60 further includes the second connector 77 (see FIGS. 10A-10B and FIGS. 11A-11F). The charging connector 107 (see FIGS. 13A-13B and FIGS. 14A-14F) is provided to the charger 100. The charging connector 107 is disposed at a position to connect with the second connector 77 when the parent device 60 is interlocked with the charger 100. Accordingly, at the same time as the parent device 60 interlocks with the charger 100 at the correct position, the second connector 77 connects to the charging connector 107. By connecting the second connector 77 to the charging connector 107, power is supplied from the charger 100 to the second battery 76 through the second connector 77 and the charging connector 107, thus charging the second battery 76.

In this manner, in the present exemplary embodiment, the attraction force generated between the second magnets 82 of the parent device 60 and the second attracting magnets 112 provided to the charger 100 at the opposing portions that oppose the second magnets 82 is capable of drawing the parent device 60 toward the charger 100. Accordingly, the parent device 60 can easily be interlocked with the charger 100 at the correct position in order to allow trouble-free charging of the second battery 76 of the parent device 60.

Moreover, the pair of second magnets 82 of the parent device 60 are provided at respective opposing portions that oppose portions on both width-direction sides of the recess 132, and the pair of second attracting magnets 112 of the charger 100 are provided at the portions on both width-direction sides of the recess 132. Accordingly, the attraction force generated between the pair of second magnets 82 and the pair of second attracting magnets 112 enables the parent device 60 to be interlocked with the charger 100 in a more consistent orientation than, for example, in state in which only one second magnet 82 and one second attracting magnet 112 are provided.

The second engagement recess 94 (see FIG. 10A to FIG. 11F) is formed at the parent device 60, and the engagement protrusion 124 that has a shape to engage with the second engagement recess 94 (see FIG. 13A to FIG. 14F) is formed to the charger 100. The second connector 77 is provided at the second engagement recess 94, and the charging connector 107 is provided to the engagement protrusion 124. Accordingly, the second connector 77 can be guided to the charging connector 107 by engaging the engagement protrusion 124 with the second engagement recess 94. This enables the second connector 77 to be smoothly connected to the charging connector 107.

Next, explanation follows regarding modified examples of the present exemplary embodiment.

Although the communication system S described in the above exemplary embodiment includes plural of the subsidiary devices 10, the communication system S may be configured including just one subsidiary device 10. Moreover, although the communication system S includes a single parent device 60 and a single charger 100, the communication system S may include plural parent devices 60 and/or chargers 100.

Although the subsidiary devices 10 are applied as electronic devices that are interlocked with the charger 100, various wearable devices or the like other than the subsidiary devices 10 that are provided with clips may be applied as electronic devices that are interlocked with the charger 100 in an electronic device-charger set.

Although a single first magnet 31 is provided to each of the subsidiary devices 10, plural first magnets 31 may be provided to each of the subsidiary devices 10. Moreover, plural of the first attracting magnets 111 corresponding to the number of first magnets 31 provided to the subsidiary devices 10 may be provided to the charger 100.

Although two of the second magnets 82 are provided to the parent device 60, one, or three or more second magnets 82 may be provided to the parent device 60. Moreover, one, or three or more second attracting magnets 112 may be provided to the charger 100 corresponding to the number of the second magnets 82 provided to the parent device 60.

Although the first magnet 31 is disposed further toward the side of the first end portion 51 than the support portion 55, the first magnet 31 may be disposed further toward the side of the second end portion 52 than the support portion 55.

Although the pair of second magnets 82 are disposed at opposing portions that oppose the portions on both width-direction sides of the recess 132, the second magnets 82 may be disposed anywhere on the parent device 60. Moreover, although the second attracting magnets 112 are disposed at the portions on both width-direction sides of the recess 132, the second attracting magnets 112 may be disposed anywhere on the charger 100, as long as they are at opposing portions that oppose the respective second magnets 82.

The first attracting magnet 111 is disposed further toward the side of the second opposing portion 142 than the apex of the curved portion 143A configuring the length direction central portion of the second shaped portion 143. However, the first attracting magnet 111 may be disposed anywhere on the bottom wall 133 as long as it is at an opposing portion of the bottom wall 133 that opposes the first attracting magnet 31. Moreover, although the first attracting magnet 111 is provided to the bottom wall 133, the first attracting magnet 111 may be provided to a side wall of the recess 132.

Although the first shaped portion 53 has an curved shape formed with the curved portion 53A at a length direction central portion thereof, the first shaped portion 53 may be configured with an curved shape formed with a bent portion at a length direction central portion thereof.

Although the first shaped portion 53 preferably has an curved shape that curves so as to follow the second shaped portion 143, the first shaped portion 53 may be configured with a different shape.

Although the second shaped portion 143 has an curved shape formed with the curved portion 143A at a length direction central portion thereof, the second shaped portion 143 may have an curved shape formed with a bent portion at a length direction central portion thereof. Moreover, a portion of the bottom wall 133 between the first opposing portion 141 and the curved portion 143A and a portion of the bottom wall 133 between the curved portion 143A and the second opposing portion 142 may, for example, each be formed with a flat shape (namely with a straight line profile in side view), or may each be formed with a curving shape.

The second shaped portion 143 has an curved shape that curves so as to gradually increase in distance from the front wall 121 on progression from the first opposing portion 141 side toward the second opposing portion 142 side. However, the second shaped portion 143 may be formed at a flat shape overall (namely with a straight line profile in side view), and be set obliquely with respect to the front wall 121 so as to gradually increase in distance from the front wall 121 on progression from the first opposing portion 141 side toward the second opposing portion 142 side.

Moreover, although the second shaped portion 143 is preferably shaped so as to gradually increase in distance from the front wall 121 on progression from the first opposing portion 141 side toward the second opposing portion 142 side, the second shaped portion 143 may be configured with a different shape.

Although the side portions 54 on both sides of the clip 12 extend parallel to each other along the length direction of the clip 12, the side portions 54 may be formed with a tapering profile such that the width therebetween decreases on progression from the first end portion 51 side toward the second end portion 52 side. Similarly, although the side faces 134 on both sides of the recess 132 are formed so as to follow the side portions 54 on both sides of the clip 12, the side faces 134 may be formed with a tapering profile such that the width therebetween decreases on progression from the first opposing portion 141 side toward the second opposing portion 142 side.

Moreover, although the body 11 of the clip 12 is rotatably supported by the support portion 55 provided between the first end portion 51 and the second end portion 52, the support portion 55 may be provided at the second end portion 52 of the clip 12.

Although the first connector 27 is preferably disposed on an extension line of the second end portion 52 side of the clip 12 as viewed from the side from which the subsidiary device 10 is interlocked with the charger 100, the first connector 27 may be disposed at a position away from the extension line of the second end portion 52 side of the clip 12.

The projection height H of the charging connector 107 is preferably set to a height such that a gap is formed between the second end portion 52 and the second opposing portion 142 in a state in which the first connector 27 and the charging connector 107 have been connected together. However, the projection height H of the charging connector 107 may be set to a height such that the second end portion 52 and the second opposing portion 142 abut each other in a state in which the first connector 27 and the charging connector 107 have been connected together.

The plural modified examples described above may also be applied in appropriate combinations.

Although explanation has been given regarding an exemplary embodiment of the technology disclosed herein, technology disclosed herein is not limited thereto, and obviously various other modifications may be implemented within a range not departing from the spirit of the technology disclosed herein.

All cited documents, patent applications, and technical standards mentioned in the present specification are incorporated by reference in the present specification to the same extent as if each individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device-charger set, comprising:
an electronic device; and
a charger with which the electronic device is configured to interlock, the electronic device including:
  a body including a battery and a connector electrically connected to the battery;
  a clip extending along the body; and
  a magnet provided at the clip, and
the charger including:
  a charging connector disposed at a position connecting with the connector in a state in which the electronic device is interlocked with the charger;
  a recess formed at a position to house the clip in a state in which the electronic device is interlocked with the charger; and
  an attracting magnet provided at a portion of the recess opposing the magnet and configured to generate an attraction force between the attracting magnet and the magnet,
the clip including:
  a first end portion configuring one length-direction end portion of the clip and being configured to abut the body;
  a second end portion configuring another length-direction end portion of the clip and being separated from the body in a state in which the first end portion abuts the body; and
  a first shaped portion configuring a portion between the first end portion and the second end portion,
the recess is formed at a wall of the charger that opposes the body,
the bottom wall of the recess includes a first opposing portion, a second opposing portion, and a second shaped portion respectively opposing the first end portion, the second end portion, and the first shaped portion,
the second shaped portion is shaped so as to gradually increase in distance from the wall on progression from a side of the first opposing portion toward a side of the second opposing portion, and
the magnet and the attracting magnet are respectively provided at the first shaped portion and the second shaped portion.

2. The electronic device-charger set of claim 1, wherein the second shaped portion has a curved shape that curves so as to gradually increase in distance from the wall on progression from the first opposing portion side toward the second opposing portion side.

3. The electronic device-charger set of claim 2, wherein the first shaped portion has a curved shape that curves so as to follow the second shaped portion.

4. The electronic device-charger set of claim 2, wherein the attracting magnet is disposed further toward a side of the second opposing portion than a length-direction central portion of the second shaped portion.

5. The electronic device-charger set of claim 1, wherein:
  the connector and the charging connector are respectively oriented so as to connect together along a direction of interlocking of the electronic device with the charger;
  the charging connector projects outward from the wall; and
  a projection height of the charging connector relative to the wall creates a gap between the second end portion and the second opposing portion in a state in which the connector and the charging connector are connected together.

6. The electronic device-charger set of claim 1, wherein the connector is disposed on an extension line of the clip toward a side of the second end portion as viewed from a side at which the electronic device with the charger are interlocked.

7. The electronic device-charger set claim 1, wherein:
  the electronic device includes a support portion configured to rotatably support the clip at the body; and
  the magnet is disposed further toward a side of the first end portion than the support portion.

8. The electronic device-charger set of claim 1, wherein:
  side portions on both sides of the clip extend parallel to each other along a length direction of the clip; and
  side faces on both sides of the recess are formed so as to follow the side portions on both sides of the clip.

9. The electronic device-charger set of claim 1, wherein:
  an engagement recess is formed at the body;
  an engagement protrusion, having a shape configured to engage with the engagement recess, is formed at the charger;
  the connector is provided at the engagement recess; and
  the charging connector is provided at the engagement protrusion.

10. A communication system, comprising:
  a subsidiary device;
  a parent device configured to communicate with the subsidiary device; and
  a charger with which the subsidiary device and the parent device are configured to selectively interlock,
the subsidiary device including:
  a body including a first battery and a first connector electrically connected to the first battery;
  a clip extending along the body; and
  a first magnet provided at the clip,
the parent device including:
  a second battery;
  a second connector electrically connected to the second battery; and
  a second magnet, and
the charger including:
  a charging connector disposed at a position connecting with the first connector in a state in which the subsidiary device is interlocked with the charger, and connecting with the second connector in a state in which the parent device is interlocked with the charger;
  a recess formed at a position to house the clip in a state in which the subsidiary device is interlocked with the charger;
  a first attracting magnet provided at a portion of the recess opposing the first magnet and configured to generate an attraction force between the first attracting magnet and the first magnet; and
  a second attracting magnet provided at a portion opposing the second magnet and configured to generate an attraction force between the second attracting magnet and the second magnet.

11. The communication system of claim 10, wherein:
  the parent device includes the second magnets at respective portions that oppose portions on respective width-direction sides of the recess; and
  the charger includes the second first attracting magnets at the portions on respective width-direction sides of the recess.

12. The communication system of claim 10, wherein:
  a first engagement recess is formed at the body;
  a second engagement recess is formed at the parent device;

an engagement protrusion having a shape configured to respectively engage with the first engagement recess and with the second engagement recess is formed at the charger;

the first connector is provided at the first engagement recess;

the second connector is provided at the second engagement recess; and the charging connector is provided at the engagement protrusion.

13. The communication system of claim 10, further comprising a plurality of the subsidiary devices.

\* \* \* \* \*